(12) United States Patent
Garner et al.

(10) Patent No.: US 9,206,066 B2
(45) Date of Patent: Dec. 8, 2015

(54) STRUCTURES AND METHODS FOR SPLICING GLASS RIBBON

(75) Inventors: Sean Matthew Garner, Elmira, NY (US); Gary Edward Merz, Rochester, NY (US); John Earl Tosch, Wellsburg, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 13/988,223

(22) PCT Filed: Nov. 29, 2011

(86) PCT No.: PCT/US2011/062327
§ 371 (c)(1),
(2), (4) Date: May 17, 2013

(87) PCT Pub. No.: WO2012/074971
PCT Pub. Date: Jun. 7, 2012

(65) Prior Publication Data
US 2013/0236675 A1    Sep. 12, 2013

Related U.S. Application Data

(60) Provisional application No. 61/418,094, filed on Nov. 30, 2010.

(51) Int. Cl.
*C03B 33/02*    (2006.01)
*B65H 19/18*    (2006.01)
(Continued)

(52) U.S. Cl.
CPC ............ *C03B 33/02* (2013.01); *B65H 19/1852* (2013.01); *C03B 33/0235* (2013.01);
(Continued)

(58) Field of Classification Search
CPC .................. B65H 19/1852; B65H 2301/4621; B65H 2301/4631; C03B 22/02; C03B 33/074; C03B 33/0235; Y10T 83/0405; Y10T 428/18
USPC ............. 225/96, 2, 103, 96.5; 83/13, 14, 864, 83/863, 56, 16; 428/54; 349/73
See application file for complete search history.

(56) References Cited

U.S. PATENT DOCUMENTS 1,105,610 A    8/1914    Bicheroux
1,731,820 A    10/1929   Lewis
(Continued)

FOREIGN PATENT DOCUMENTS

EP    1127821    5/2005
JP    4-243755   8/1992
(Continued)

OTHER PUBLICATIONS

International Searching Authority; International Search Report; Mailing Date: Jul. 12, 2012; pp. 1-7.

*Primary Examiner* — Ghassem Alie
(74) *Attorney, Agent, or Firm* — Jeffrey A. Schmidt

(57) ABSTRACT

A first glass-ribbon portion (12) and a second portion (22) of a glass ribbon (10) are separated from one another by a gap (40), and a splice joint (30) coupling the first glass-ribbon portion to the second portion. A splice member (31) of the splice joint has a Young's modulus and cross sectional area such that, when subject to a force of 20 kg, the splice member undergoes an elongation of ≤20%. A filler material (80) may be disposed in the gap. Also, there are disclosed methods of splicing a glass ribbon, and preparing a coated glass ribbon for splicing. Tape (70) is applied to glass ribbon in one embodiment of a method of splicing the glass ribbon. In this embodiment, the glass ribbon is cut together with the tape so as to create a free end in the glass ribbon.

2 Claims, 5 Drawing Sheets

(51) Int. Cl.
*C03B 33/023* (2006.01)
*C03B 33/07* (2006.01)

(52) U.S. Cl.
CPC ....... *C03B33/074* (2013.01); *B65H 2301/4621* (2013.01); *B65H 2301/4631* (2013.01); *B65H 2801/61* (2013.01); *Y10T 83/0405* (2015.04); *Y10T 428/18* (2015.01)

(56) References Cited

U.S. PATENT DOCUMENTS

| | | | |
|---|---|---|---|
| 1,895,779 A * | 1/1933 | Aurien et al. | 225/2 |
| 2,386,346 A | 10/1945 | Roesen | |
| 3,089,801 A | 5/1963 | Etal | |
| 3,233,489 A | 2/1966 | Quarve | |
| 3,292,477 A | 12/1966 | Raftery | |
| 3,573,146 A | 3/1971 | Guinan et al. | |
| 3,754,884 A * | 8/1973 | McDavid et al. | 65/97 |
| 3,833,447 A | 9/1974 | Gustafson | 156/505 |
| 4,120,739 A | 10/1978 | Peeters et al. | 156/506 |
| 4,487,350 A * | 12/1984 | DeTorre | 225/2 |
| 5,118,453 A | 6/1992 | Leyens et al. | 264/22 |
| 5,323,981 A | 6/1994 | Dionne | 242/58.5 |
| 5,622,540 A * | 4/1997 | Stevens | 65/112 |
| 5,692,699 A | 12/1997 | Weirauch et al. | 242/556.1 |
| 6,735,982 B2 | 5/2004 | Matthies | 65/111 |
| 6,815,070 B1 | 11/2004 | Bürkle et al. | 428/425.6 |
| 7,439,665 B2 * | 10/2008 | Wakayama | 313/493 |
| 2004/0172975 A1 | 9/2004 | Hirota et al. | 65/42 |
| 2005/0056127 A1* | 3/2005 | Yamabuchi et al. | 83/13 |
| 2005/0245051 A1* | 11/2005 | Maekawa et al. | 438/462 |
| 2006/0109416 A1 | 5/2006 | Smovzh | 349/187 |
| 2006/0255083 A1* | 11/2006 | Bonaddio et al. | 225/2 |
| 2007/0170300 A1 | 7/2007 | Titz et al. | 242/552 |
| 2008/0050888 A1 | 2/2008 | Garner et al. | 438/463 |
| 2009/0081851 A1 | 3/2009 | Sakamoto et al. | 438/463 |
| 2009/0250446 A1 | 10/2009 | Sakamoto | 219/121.72 |
| 2010/0162758 A1* | 7/2010 | Lang | 65/29.11 |
| 2010/0192634 A1 | 8/2010 | Higuchi et al. | 65/60.1 |
| 2013/0255055 A1* | 10/2013 | Murgatroyd | 29/419.1 |

FOREIGN PATENT DOCUMENTS

| | | |
|---|---|---|
| JP | 5-297334 | 11/1993 |
| JP | 2005-225925 | 8/2005 |
| JP | 2006-250345 | 9/2006 |
| WO | 2010/038757 | 4/2010 |

* cited by examiner

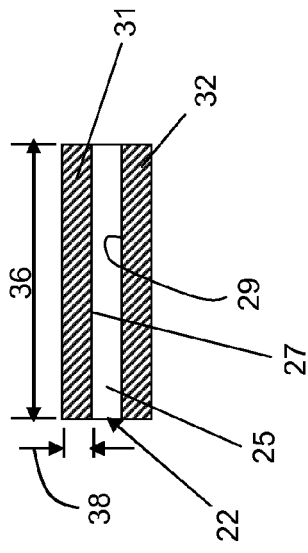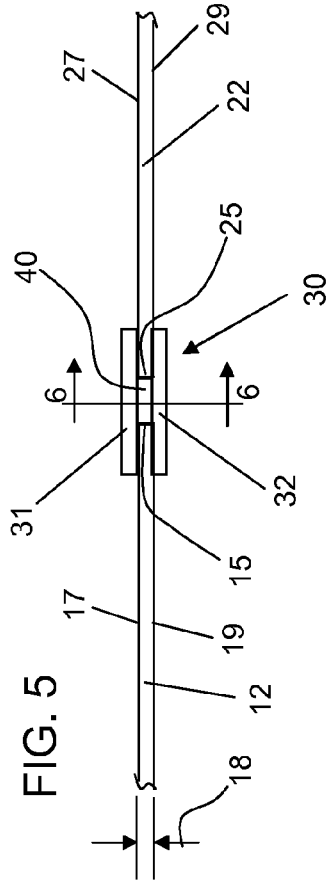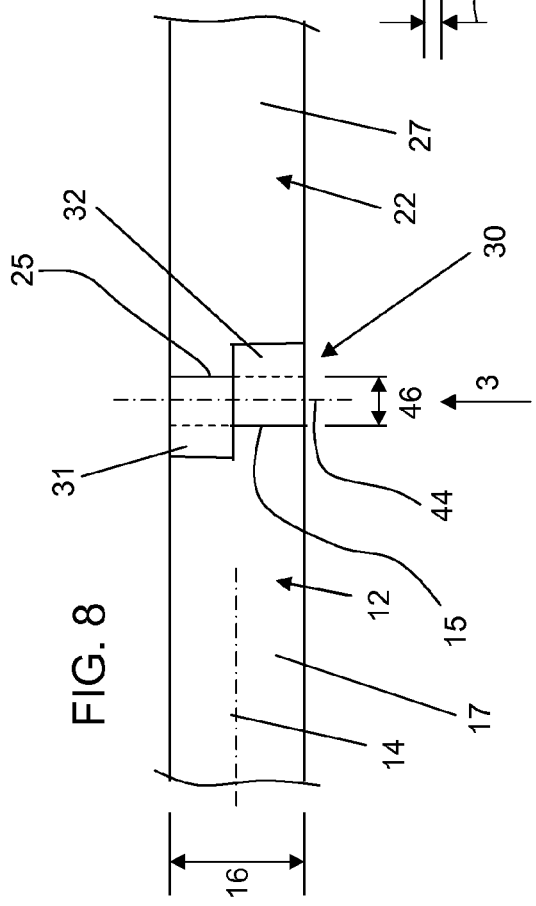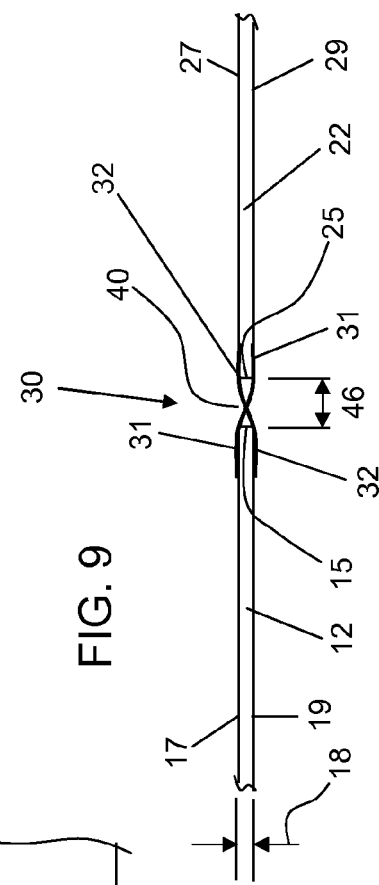

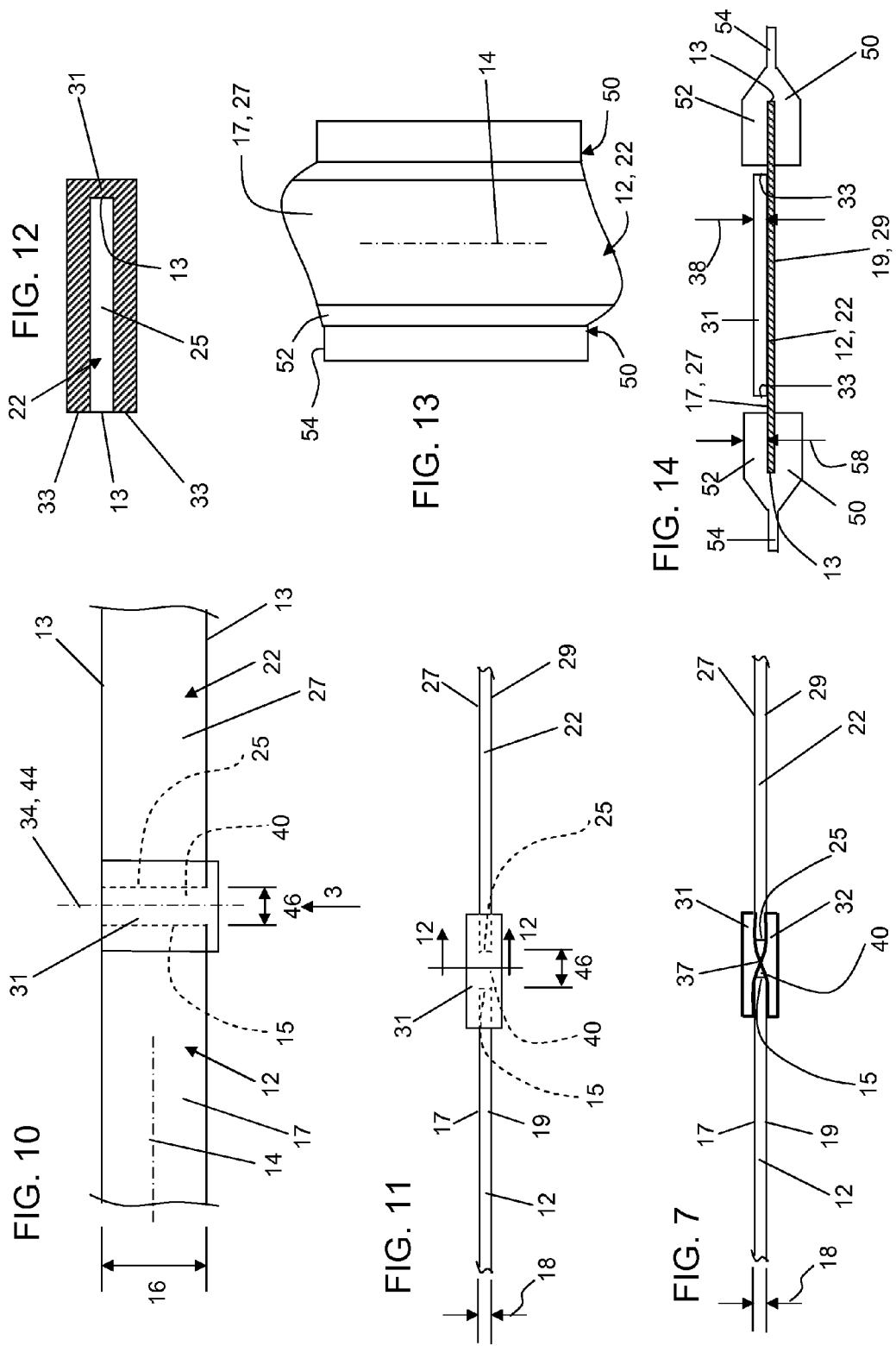

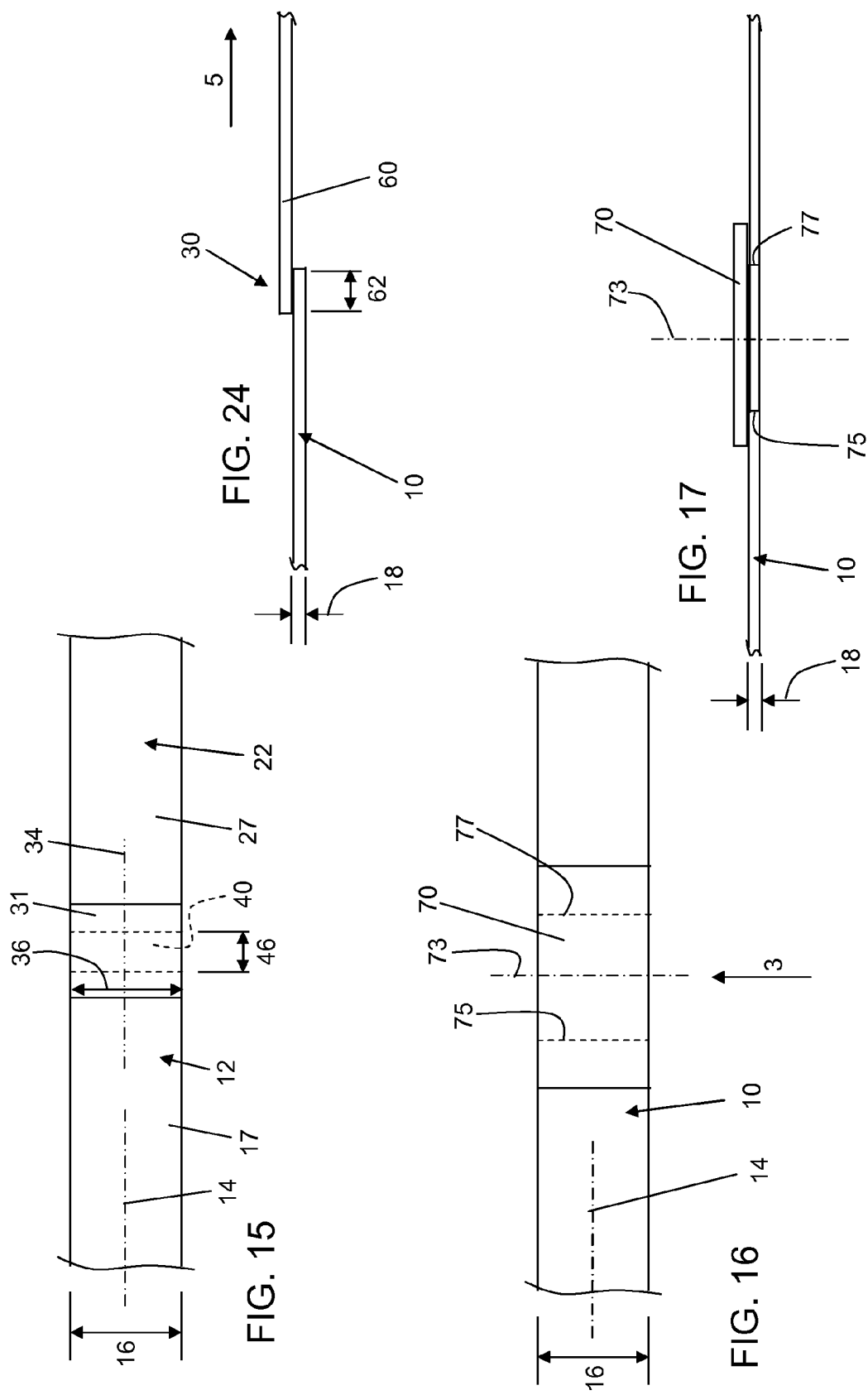

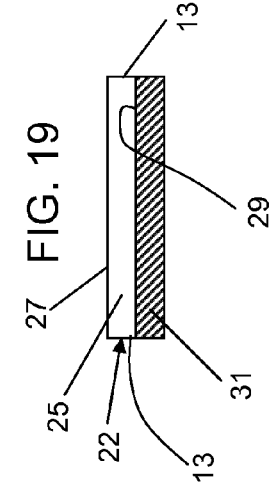
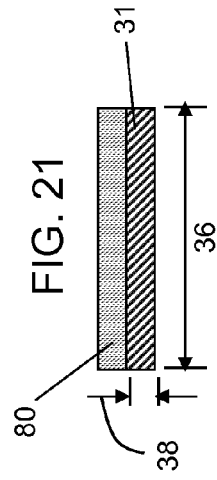
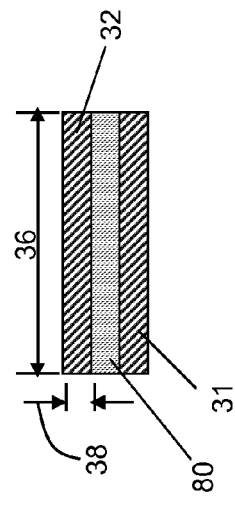
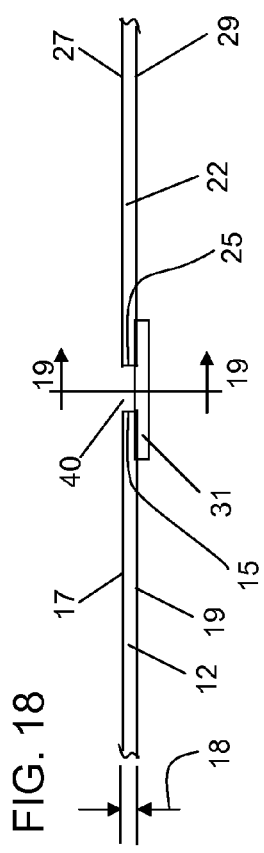
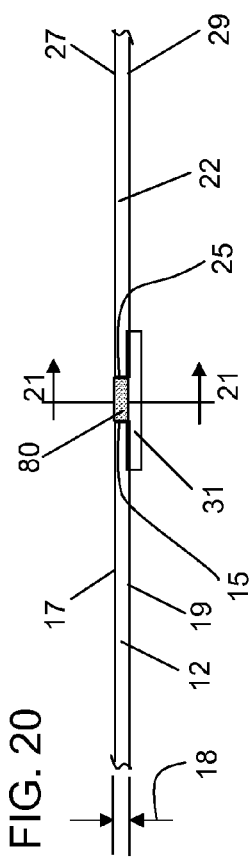
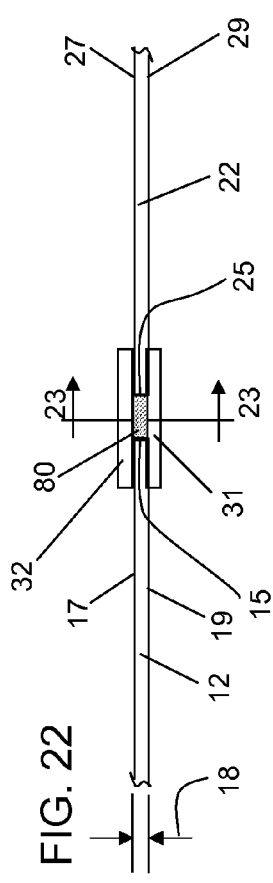

STRUCTURES AND METHODS FOR SPLICING GLASS RIBBON

This application claims the benefit of priority under 35 USC §119 of U.S. Provisional Application Ser. No. 61/418,094 filed on Nov. 30, 2010 the content of which is relied upon and incorporated herein by reference in its entirety.

BACKGROUND

1. Field

The present invention relates to glass ribbons and, more particularly, to structures and methods for splicing portions of glass ribbons to one another or to leader/trailer materials.

2. Technical Background

There is interest in using glass in roll-to-roll fabrication of flexible electronic or other devices. Glass has several beneficial properties related to either the fabrication or performance of electronic devices. Currently these devices are being fabricated on polymer film or metal foil because a complete solution for the use of flexible glass does not exist. Use of polymer or metal substrates results in either reduced end device performance or increased cost. A more complete solution for the use of flexible glass in roll-to-roll processes would accelerate its adoption into this application.

One missing component in the use of spooled flexible glass in roll-to-roll processes is a practical method to splice glass ribbon (either be it one glass portion to another, or a glass portion to a leader/trailer material). In roll-to-roll manufacturing situations, there is a common requirement to be able to splice web materials together. The solutions for splicing common web materials such as polymer, paper, metal, and other webs, are not appropriate for glass because of the different material properties involved, notably the brittle nature of glass. Accordingly, there is a need for practical solutions for splicing glass ribbon portions to one another or to other web materials, for example leader/trailer material.

SUMMARY

Disclosed herein are various embodiments of structures and methods for splicing glass ribbon portions to one another as well as to other web materials, for example, leader/trailer materials. Throughout the disclosure the term "glass" is used for sake of convenience, but is representative of other like brittle materials, for example glass ceramics and ceramics, that may be formed into flexible ribbons≤about 0.3 mm thick, for example, 0.3 mm, 0.25 mm, 0.20 mm, 0.15 mm, 0.10 mm, 0.05 mm, 0.025 mm, 0.020 mm, 0.015 mm, and 0.010 mm. The structures and methods disclosed herein provide a manner of achieving, with glass, functions similar to those to which manufactures are accustomed to for polymer, paper, and metal web material systems. This reduces customer switching costs, increases yield of the process using flexible glass substrates by reducing the number of process start-ups due to the end of a substrate spool, thereby lowering the cost of usage for spooled glass substrates. These structures and methods also provide a splice having higher alignment and registration accuracy, which results in the ability to convey the glass ribbon through different processes with improved quality and reliability. Additionally, there are benefits for the glass producer. More specifically, the structures and methods disclosed herein enable the glass manufacturer to couple several shorter lengths of glass ribbon together and roll them into a spool instead of scrapping those shorter lengths, which leads to increased yield and reduced costs. Further, the structures and methods disclosed herein would allow the glass manufacturer to cut out sections of flexible glass ribbon that may have defects, and couple together the remaining useable sections.

The inventors have found various aspects of the splice joint itself, as well as of the manner of preparing the splice joint, that lead to a more durable glass ribbon, i.e., one that confidently can be conveyed through roll-to-roll processing with reduced risk of misalignment and damage arising from the splice joint.

With respect to the splice joint itself, for example, the inventors found that the glass ribbon portions should be gapped apart from one another so that the ends of the portions do not rub or abrade one another, which may lead to cracking or propagation of cracks in the glass ribbon. And the ends of the glass ribbon portions should remain gapped apart throughout processing of the glass ribbon. That is, the splice joint should be firm so that the glass ribbon portions remain aligned during conveyance. The ends of the glass ribbon portions can be firmly and reliably held apart by the splice member, and the ribbon portions aligned, if the splice member has a Young's modulus and cross sectional area so that when subject to a force of 20 kg (i.e., a 20 kgf=200 N), the splice member undergoes an elongation of ≤20%. In another embodiment, the splice member has a Young's modulus and cross sectional area so that when subject to a force of 20 kg (i.e., a 20 kgf=200 N), the splice member undergoes an elongation of ≤10%. And in still another embodiment, the splice member has a Young's modulus and cross sectional area so that when subject to a force of 20 kg (i.e., a 20 kgf=200 N), the splice member undergoes an elongation of ≤5%. For example, the splice member may have a Young's modulus of ≥1 GPa, ≥2 GPa, ≥5 GPa, ≥10 GPa. Additionally, the reliability and durability of the splice joint can be increased by disposing material in the gap, for example, a portion of the splice member itself or a filler material. The material in the gap assists in preventing the ends of the glass ribbon from rubbing or abrading one another, as well as limits the amount of wet processing material that may be contained in the gap during ribbon processing; which wet processing material may then otherwise lead to contamination of downstream processes. Additionally, filling the gap prevents process fluid from impinging on the ends of the glass ribbon, thereby preventing the fluid from propagating cracks and/or dislodging sections of the ribbon as it is processed.

With respect to the manner of preparing the splice joint, the inventors have found that certain steps may be taken to reduce the risk of damage to the glass of the ribbon as it is cut, by using structures that limit the propagation of cracks in the glass ribbon portions. More particularly, a reinforcing member may be applied to the glass ribbon in the area of the intended cut line, or structures may be produced within the glass itself. For example, an adhesive tape may be applied over the intended cut line to prevent any cracks from further propagation, and/or contain particulate matter as the ribbon is cut. The structures produced in the glass may be, for example, intentional fractures at which there would stop any crack induced by the cutting of the ribbon either during the cutting process, or initiated by the cutting process and later propagated as the ribbon is conveyed and/or processed.

Additional features and advantages will be set forth in the detailed description which follows, and in part will be readily apparent to those skilled in the art from the description or recognized by practicing the invention as exemplified in the written description and the appended drawings. It is to be understood that both the foregoing general description and the following detailed description are merely exemplary of the invention, and are intended to provide an overview or framework to understanding the nature and character of the invention as it is claimed.

The accompanying drawings are included to provide a further understanding of principles of the invention, and are incorporated in and constitute a part of this specification. The drawings illustrate one or more embodiment(s), and together with the description serve to explain, by way of example, principles and operation of the invention. It is to be understood that various features of the invention disclosed in this specification and in the drawings can be used in any and all combinations. By way of non-limiting example the various features of the invention may be combined with one another in various aspects as follows:

According to a first aspect, there is provided a glass ribbon comprising:
 a first glass-ribbon portion;
 a second portion;
 a splice joint coupling the first glass-ribbon portion to the second portion, wherein the splice joint comprises:
  a splice member having a Young's modulus and cross sectional area so that when subject to a force of 20 kg the splice member undergoes an elongation of ≤20%, preferably ≤10%, and still more preferably ≤5%.

According to a second aspect, there is provided the glass ribbon according to aspect 1, wherein the splice joint is a butt joint having a gap between the first glass-ribbon portion and the second portion.

According to a third aspect, there is provided the glass ribbon according to aspect 2, wherein the first glass-ribbon portion includes a longitudinal axis and a width, and the gap is substantially perpendicular to the longitudinal axis across the width.

According to a fourth aspect, there is provided the glass ribbon according to aspect 2 or aspect 3, wherein each of the first and second portions includes a first major surface and a second major surface, and wherein the splice member is disposed in two sections wherein the first section is disposed on the first major surfaces of the first and second portions, and the second section is disposed on the second major surfaces of the first and second portions.

According to a fifth aspect, there is provided the glass ribbon according to aspect 4, wherein the first major surface of the first glass-ribbon portion is coplanar with the second major surface of the second portion, and the second major surface of the first glass-ribbon portion is coplanar with the first major surface of the second portion.

According to a sixth aspect, there is provided the glass ribbon according to aspect 2, wherein each of the first and second portions includes a first major surface and a second major surface, wherein the first major surfaces are coplanar, wherein the second major surfaces are coplanar, and wherein the splice member is disposed so as to contact the first major surfaces of the first and second portions and to contact the second major surfaces of the first and second portions.

According to a seventh aspect, there is provided the glass ribbon according to aspect 3, wherein the first and second sections of the splice member contact one another within the gap.

According to an eighth aspect, there is provided the glass ribbon according to aspect 1, wherein the first glass-ribbon portion has first and second major surfaces and edges, and wherein the first glass-ribbon portion includes an edge tab bonded along one of the edges of its major surfaces.

According to a ninth aspect, there is provided the glass ribbon according to aspect 8, wherein the splice member does not overlap the edge tab.

According to a tenth aspect, there is provided the glass ribbon according to aspect 9, wherein the splice member has a thickness above the first major surface of the first glass-ribbon portion, the edge tab has a thickness above the first major surface of the first glass-ribbon portion, and wherein the thickness of the splice member is ≤the thickness of the edge tab.

According to an eleventh aspect, there is provided the glass ribbon according to any one of aspects 2 to 10, further comprising a filler material disposed within the gap.

According to a twelfth aspect, there is provided the glass ribbon according to aspect 11, wherein the filler material comprises at least one of a polymer or silicone material.

According to a thirteenth aspect, there is provided the glass ribbon according to aspect 11, wherein the filler material is a hardenable polymer.

According to a fourteenth aspect, there is provided the glass ribbon according to any one of aspects 2-13, wherein the gap has a width that is ≥100 microns.

According to a fifteenth aspect, there is provided the glass ribbon according to any of aspects 1-14, wherein the thickness of the glass ribbon is 50 microns to 300 microns.

According to a sixteenth aspect, there is provided the glass ribbon according to any one of aspects 1-15, wherein the first glass-ribbon portion includes a first longitudinal axis, wherein the second portion includes a second longitudinal axis, and wherein the second longitudinal axis is disposed coaxial with the first longitudinal axis.

According to a seventeenth aspect, there is provided the glass ribbon according to any one of aspects 1-16, wherein the first glass-ribbon portion includes a first longitudinal axis, wherein the splice member includes a longitudinal axis, and wherein the splice-member longitudinal axis is disposed substantially perpendicular to the first longitudinal axis.

According to an eighteenth aspect, there is provided the glass ribbon according to any one of aspects 1-16, wherein the first glass-ribbon portion includes a first longitudinal axis, wherein the splice member includes a longitudinal axis, and wherein the splice-member longitudinal axis is disposed substantially coaxial with the first longitudinal axis, and
 further wherein the first glass-ribbon portion includes a width, the splice member includes a width, and the width of the splice member is substantially equal to the width of the first glass-ribbon portion.

According to a nineteenth aspect, there is provided the glass ribbon according to any one of aspects 1-18, wherein the splice member has a Young's modulus ≥1 GPa.

According to a twentieth aspect, there is provided a glass ribbon comprising:
 a first glass-ribbon portion;
 a leader or trailer made of a material other than glass, wherein the leader or trailer is electrostatically coupled to the first glass-ribbon portion.

According to a twenty first aspect, there is provided the glass ribbon according to any one of aspects 1-20, wherein the glass ribbon is formed into a roll.

According to a twenty second aspect, there is provided a method of splicing a first glass ribbon portion to a second portion comprising:
 disposing the first and second portions adjacent to one another and separated so as to form a gap between them;
 applying a splice member so as to couple the first and second portions while maintaining at least a portion of the gap, wherein the splice member has a Young's Modulus and a cross sectional area so that when the splice member is subject to a force of 20 kg the splice member undergoes an elongation of ≤20%, preferably ≤10%, and more preferably ≤5%.

According to a twenty third aspect, there is provided the method of aspect 22, wherein each of the first and second portions includes a first and second major surface, and wherein the step of applying the splice member includes applying the splice member to the first and second major surfaces of both the first and second portions.

According to a twenty fourth aspect, there is provided the method of aspect 22, wherein each of the first and second portions includes a first and second major surface, and wherein the step of applying the splice member includes applying a first splice member to the first major surfaces and applying a second splice member to the second major surfaces.

According to a twenty fifth aspect, there is provided the method of aspect 23 or aspect 24, further comprising disposing in the gap a polymer or silicone material, wherein the step of disposing is performed between the step of applying the splice member to the first major surfaces of the first and second portions, and the step of applying the splice member to the second major surfaces of the first and second portions.

According to a twenty sixth aspect, there is provided the method of aspect 25, wherein the first major surfaces of the first and second portions are substantially coplanar.

According to a twenty seventh aspect, there is provided the method of any one of aspects 22-26, wherein the splice member is made of a material other than glass, and the step of applying the splice member includes coupling the splice member to the first and second portions by electrostatic force.

According to a twenty eighty aspect, there is provided the method of any one of aspects 21-26, wherein the splice member has a Young's modulus of ≥1 GPa.

According to a twenty ninth aspect, there is provided a method of splicing a first glass ribbon portion to a second member comprising:
disposing the first glass-ribbon portion and the second member adjacent to one another;
coupling a splice member to both the first glass-ribbon portion and the second member by electrostatic force.

According to a thirtieth aspect, there is provided the method of aspect 29, wherein the second member is a second glass ribbon portion.

According to a thirty first aspect, there is provided the method of aspect 29, wherein the second member is a leader or trailer made of a material other than glass.

According to a thirty second aspect, there is provided the method of aspect 29, wherein the step of disposing further comprises disposing the first glass-ribbon portion and the second member adjacent to one another and spaced from each other by a gap.

According to a thirty third aspect, there is provided the method of any one of aspects 22, 23, 24, 25, or 32, further comprising disposing in the gap a polymer or silicone material.

According to a thirty fourth aspect, there is provided the method of any one of aspects 22-33, wherein the splice member is a tape.

According to a thirty fifth aspect, there is provided a method of splicing glass ribbon comprising:
applying tape to the glass ribbon; and
cutting the glass ribbon together with the tape so as to create a free end in the glass ribbon.

According to a thirty sixth aspect, there is provided the method according to aspect 35, further comprising creating a fracture line in the glass ribbon wherein the tape is disposed across the fracture line.

According to a thirty seventh aspect, there is provided the method according to aspect 36, wherein the fracture line extends across the full width of the glass ribbon.

According to a thirty eighth aspect, there is provided the method according to aspect 36 or aspect 37, wherein the fracture line is created by applying a bending stress to the glass ribbon.

According to a thirty ninth aspect, there is provided the method according to any one of aspects 35-38, wherein the cutting is performed by extending a blade or rotary cutter through the thickness of the glass ribbon.

According to a fortieth aspect, there is provided the method according to any one of aspects 33-39, wherein the glass ribbon includes first and second major surfaces, and wherein applying the tape comprises applying tape to both major surfaces of the glass ribbon prior to the step of cutting.

According to a forty first aspect, there is provided the method according to any one of aspects 35-40, further comprising creating a second fracture line in the glass ribbon, wherein the tape is disposed across the second fracture line, and wherein the cutting comprises cutting between the fracture line and the second fracture line.

According to a forty second aspect, there is provided a method of preparing a coated glass ribbon for splicing comprising:
determining an intended cutting line along which the coated ribbon is to be cut;
creating a fracture line in the glass ribbon without completely severing the coating, wherein the fracture line is disposed between the intended cutting line, and the portion of the ribbon to be used after being cut; and
cutting the coated glass ribbon along the intended cutting line.

According to a forty third aspect, there is provided a method according to aspect 41 or aspect 42, further comprising joining the cut end of the glass ribbon to a leader or trailer.

According to a forty fourth aspect, there is provided a glass ribbon comprising a free end, a coating or polymer tape disposed on the glass ribbon adjacent to the free end, and a fracture line in the portion of the glass ribbon on which there is the coating or polymer tape and that is inboard of the free end, wherein the fracture line extends across the width of the glass ribbon.

BRIEF DESCRIPTION OF THE DRAWINGS

FIG. 5 is a side view of a glass ribbon having a splice joint according to a second embodiment.

FIG. 6 is a cross-sectional view as taken along line 6-6 of FIG. 5.

FIG. 7 is a side view of a glass ribbon having a splice joint according to a variation of the second embodiment.

FIG. 8 is a top view of a glass ribbon having a splice joint according to a third embodiment.

FIG. 9 is a side view of the glass ribbon as seen along the direction of arrow 3 in FIG. 8.

FIG. 10 is top view of a glass ribbon having a splice joint according to a fourth embodiment.

FIG. 11 is a side view of the glass ribbon as seen along the direction of arrow 3 in FIG. 10.

FIG. 12 is a cross sectional view as taken along line 12-12 of FIG. 11.

FIG. 13 is a top view of a glass ribbon for splicing according to a fifth embodiment.

FIG. 14 is a schematic cross-sectional view of a splice joint as applied to the glass ribbon of FIG. 13.

FIG. 15 is a top view of a glass ribbon having a splice joint according to a sixth embodiment.

FIG. 16 is a top view of a glass ribbon in preparation for cutting.

FIG. 17 is a side view of the ribbon as seen along the direction of arrow 3 in FIG. 16.

FIGS. 18-23 show various steps in forming a splice joint having a filler material, wherein FIGS. 18, 20, and 22 are side views of the glass ribbon, and wherein FIG. 19 is a cross sectional view as taken along line 19-19 of FIG. 18, FIG. 21 is a cross sectional view as taken along line 21-21 of FIG. 20, and FIG. 23 is a cross sectional view as taken along line 23-23 of FIG. 22.

FIG. 24 is a side view of a glass ribbon spliced to a leader.

DETAILED DESCRIPTION

Figure 2:
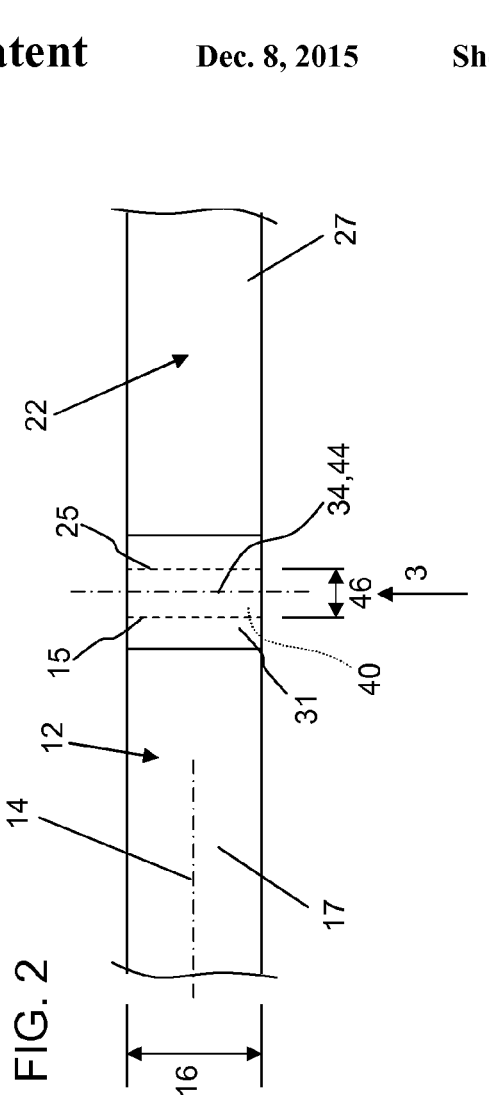
FIG. 2 is a top view of a glass ribbon having a splice joint.
Figure 3:
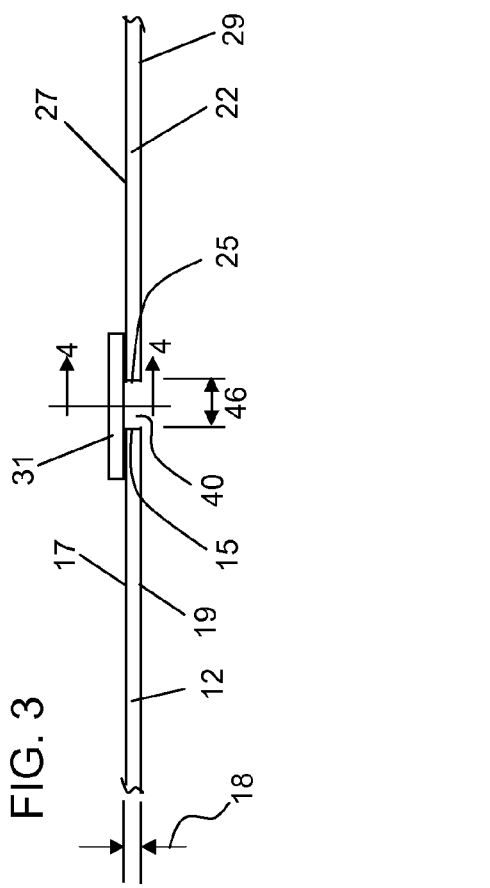
FIG. 3 is a side view of a glass ribbon as seen along the direction of arrow 3 in FIG. 2.

In the following detailed description, for purposes of explanation and not limitation, example embodiments disclosing specific details are set forth to provide a thorough understanding of various principles of the present invention. However, it will be apparent to one having ordinary skill in the art, having had the benefit of the present disclosure, that the present invention may be practiced in other embodiments that depart from the specific details disclosed herein. Moreover, descriptions of well-known devices, methods and materials may be omitted so as not to obscure the description of various principles of the present invention. Finally, wherever applicable, like reference numerals refer to like elements throughout the embodiments.

Ranges can be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

Directional terms as used herein—for example up, down, right, left, front, back, top, bottom—are made only with reference to the figures as drawn and are not intended to imply absolute orientation.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

As used herein, the singular forms "a," "an" and "the" include plural referents unless the context clearly dictates otherwise. Thus, for example, reference to a "component" includes aspects having two or more such components, unless the context clearly indicates otherwise.

There may be various different embodiments of the splice joint itself. In the splice joint, the glass ribbon portions should be gapped apart from one another so that the ends of the portions do not rub or abrade one another, which may lead to cracking or propagation of cracks in the glass ribbon. And the ends of the glass ribbon portions should remain gapped apart throughout processing of the glass ribbon. The ends of the glass ribbon portions can be firmly and reliably held apart by the splice member if the splice member has a Young's modulus and cross sectional area so that when subject to a force of 20 kg (i.e., a 20 kgf=200 N), the splice member undergoes an elongation of ≤20%. In another embodiment, the splice member has a Young's modulus and cross sectional area so that when subject to a force of 20 kg (i.e., a 20 kgf=200 N), the splice member undergoes an elongation of ≤10%. And in still another embodiment, the splice member has a Young's modulus and cross sectional area so that when subject to a force of 20 kg (i.e., a 20 kgf=200 N), the splice member undergoes an elongation of ≤5%. For example, the splice member may have a Young's modulus of ≥1 GPa, ≥2 GPa, ≥5 GPa, or ≥10 GPa. Additionally, the reliability and durability of the splice joint can be increased by disposing material in the gap, for example, a portion of the splice member itself or a filler material.

Figure 1:
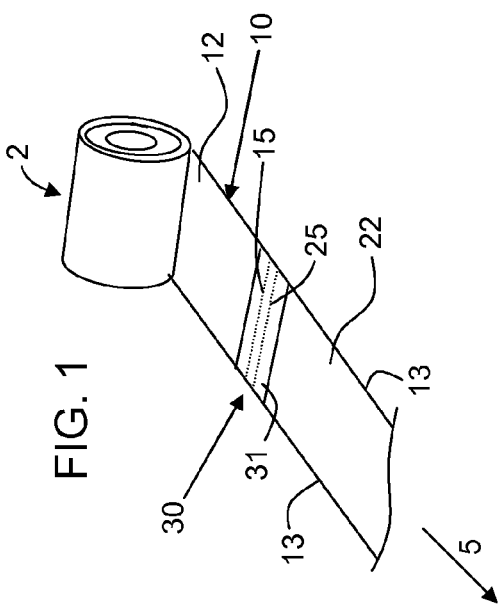
FIG. 1 is a perspective view of a glass ribbon including a splice joint.
Figure 4:
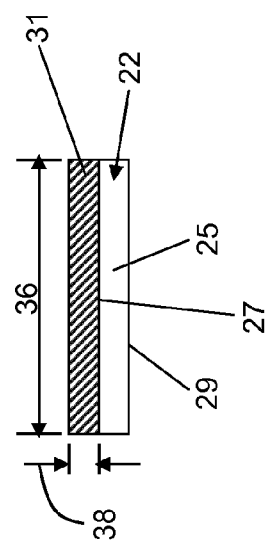
FIG. 4 is a cross-sectional view of a splice joint as taken along line 4-4 in FIG. 3.

A first embodiment of a splice joint 30 will be described in connection with FIGS. 1-4. A roll 2 of glass ribbon 10 includes a splice joint 30 that couples a first portion 12 of the glass ribbon to a second portion 22. The glass ribbon 10 includes edges 13, a longitudinal axis 14, a width 16, and a thickness 18. The first portion 12 includes an end 15 and, similarly, the second portion 22 includes an end 25. The first portion 12 includes a first major surface 17 and a second major surface 19. Similarly, the second portion 22 includes a first major surface 27 and a second major surface 29. The second portion 22 may be a second portion of glass ribbon 10, or may be a leader or trailer made of a material other than glass. Throughout the description, for convenience and consistency of explanation only, the second portion 22 is referred to as a second portion of glass ribbon. The edges 13 may be either as formed edges, i.e. ones that include "beads" or thickened portions relative to the central portion of the glass ribbon 10. Alternatively, the edges 13 may be cut edges, i.e., edges wherein the beads have been removed, for example, by laser cutting. The width 16 may be any suitable width, and the thickness 18 is ≤0.3 mm thick, for example, 0.3 mm, 0.25 mm, 0.20 mm, 0.15 mm, 0.10 mm, 0.05 mm, 0.025 mm, 0.020 mm, 0.015 mm, and 0.010 mm. As shown in FIG. 1, the glass ribbon 10 is unrolled from the roll 2 and fed along the direction of arrow 5 to downstream processes which may include, for example, any step subsequent to the formation of the glass, including but not limited to grinding, polishing, cleaning, the deposition of additional layers and/or components (e.g. a polymer protective layer, electrical/electronic components or portions thereof) on the glass, the formation of thin film devices (e.g. transistors, electroluminescent layers, etc.) on the glass, cutting (including into sheets or adjusting the width), splicing, rolling into another roll (either with or without interleaving material), etching processes either wet or plasma, or lamination to other films or structures. The downstream processes may be part of producing a glass ribbon 10, or part of processing the ribbon (including with roll-to-roll process methods).

The splice joint 30 is one that firmly holds the first portion 12 relative to the second portion 22. It is desirable to hold the portions 12, 22 firmly with respect to one another so that longitudinal axes of portions 12 and 22 remain substantially aligned which, in turn leads to a higher registration accuracy near the splice joint 30 and, thus the ability to convey the glass ribbon 10 through different downstream processes with improved quality. Additionally, the firmness of the splice joint 30 holds the ends 15, 25 away from one another across the gap 40 so that they do not rub or abrade one another, which would likely lead to crack initiation and/or propagation in the ribbon portions 12, 22 or increased stress at the ends 15 and 25. The splice joint 30 includes a splice member 31 having a longitudinal axis 34, a width 36, and a thickness 38. In order to hold the portions 12 and 22 firmly with respect to one another, the splice member 31 has a low elongation, whereby it will not stretch along axis 14, or twist about an axis perpendicular both to its own longitudinal axis 34 and to the axis 14. In order to meet the foregoing criteria, the inventors have found that a splice member should have a Young's modulus and cross sectional area so that when subject to a force of 20 kg (i.e., a 20 kgf=200 N), the splice member undergoes an elongation of ≤20%. The cross sectional area is that of the splice member as disposed adjacent to the gap 40, and the initial length of the splice member being equal to the width 46 of the gap 40. In another embodiment, the splice member has a Young's modulus and cross sectional area so that when subject to a force of 20 kg (i.e., a 20 kgf=200 N), the splice member undergoes an elongation of ≤10%. And in still another embodiment, the splice member has a Young's modulus and cross sectional area so that when subject to a force of 20 kg (i.e., a 20 kgf=200 N), the splice member undergoes an elongation of ≤5%. For example, the splice member may have a Young's modulus of ≥1 GPa. For example, the splice member 31 may be made of polyimide tape (for example Kapton® as made by DuPont), polyethylene napthalate (PEN) tape, or a variety of splice tapes as available from 3M. The choice of material can be selected to be compatible with the contemplated downstream processing of the glass ribbon 10 in terms of temperature, chemical (including outgassing), and mechanical strength, parameters. The splice member 31 may be a self-adhesive tape, a tape to which adhesive is applied, or a tape which is laid over adhesive on the glass ribbon 10. Alternatively, the splice member 31 may be a non-metallic member to which an electrostatic charge may be applied so as to electrostatically couple it to the glass ribbon 10. Throughout the specification, for the sake of convenience, the splice member 31 (and second splice member 32) are discussed as if they were self adhesive tapes, although such need not be the case.

In the splice joint 30, the ends 15, 25 are placed adjacent one another, but spaced apart by a gap 40 having a width 46. The gap 40 extends along a longitudinal axis 44 that is substantially perpendicular to the longitudinal axis 14. It is preferable that the ends 15 and 25 are disposed substantially perpendicular to the longitudinal axis 14 so that they need not be subject to the same strength requirements as the edges 13 for a ribbon of this thickness. That is, because the ends 15, 25 are substantially perpendicular to the axis 14, they will not be subject to bend stresses (as when the ribbon 10 is bent around a roller) exerted on the ribbon 10 from the processing equipment in the downstream processes, as are the edges 13. Accordingly, the ends 15, 25 need not have the same strength as edges 13, and may be formed quickly with less rigorous cutting/separating methods. In FIG. 2, the longitudinal axis 34 is shown as being aligned with the longitudinal axis 44, i.e., the axis 34 is directly above the axis 44 (as shown in the figures), however this need not be the case. For example, the axis 34 may be oblique to axis 14 and/or axis 44. The width 46 is sized so that the ends 15, 25 do not rub against one another as the portions 12, 22 rotate about the axis 44 (or an axis parallel therewith within the width 46) as when, for example, bending around a roller in a downstream process through which the ribbon 10 is conveyed. If the ends 15, 25 were to rub against one another, glass particles may be generated which may contaminate any process being performed on the glass ribbon 10, or undesirably may generate or propagate cracks in the glass ribbon 10. Alternatively, the repeated rubbing and/or abrading of the ends 15, 25 against one another may form and/or propagate cracks in the portions 12, 22. In order to avoid rubbing/abrading of the ends 15, 25 against one another, the width 46 may be ≥100 microns. For example the width 46 may be ≥100 microns, ≥200 microns, ≥500 microns, ≥1000 microns. Also, such a width allows the ends 15, 25 to be formed by low-cost mechanical separating methods, for example, scribe and break, by blade, rotary cutter, or shearing. That is, the gap 40 allows the ends 15, 25 to be disposed adjacent to one another even if they are not completely parallel to one another, and/or are not perfectly perpendicular to the longitudinal axis 14.

In this embodiment, the splice member 31 is shown as being coupled to the first major surfaces 17, 27. Alternatively, the splice member 31 may be coupled to the second major surfaces 19, 29 instead.

A second embodiment will be explained in connection with FIGS. 1 and 5-7. In this embodiment, mainly the differences from the first embodiment will be described, with the understanding that the remaining elements are similar to those described in connection with the first embodiment, and wherein like reference numerals denote like elements throughout the embodiments. In this embodiment, a first splice member 31 is coupled to the first major surfaces 17, 27. Additionally, a second splice member 32 is coupled to the second major surfaces 19, 29. The second 32 splice member has the same characteristics as set forth above in connection with the splice member 31 of the first embodiment. As shown in FIG. 6, the splice members 31, 32 extend across the full width 16 of the glass ribbon 10, however, in some circumstances this need not be the case. Additionally, the splice members 31, 32 are shown as having the same width as one another, however, again, this need not be the case. Further, the splice members 31, 32 may extend generally parallel to one another and remain out of the gap 40 as shown in FIGS. 5 and 6 or, alternatively, may extend into the gap 40 even to the point of contacting one another at 37 as shown in FIG. 7. Having the splice members 31, 32 extend into the gap 40 provides additional protection from the ends 15, 25 rubbing against one another. As with the first embodiment, the gap 40 may have a similar width as described above. This embodiment provides an increased firmness (in ability to hold the first 12 and second 22 portions in axial alignment with one another) as well as increased resistance to rotation about axis 44, from that in the first embodiment due to the presence of second splice member 32. Additionally, this embodiment is less susceptible than is the first embodiment to having process fluids enter the gap 40. If process fluids enter the gap 40 and remain there in a liquid state, they may undesirably contaminate downstream processes. Additionally, due to the presence of second splice member 32 on the second major surfaces 19, 29, the ends 15, 25 are less likely to catch on process equipment as the ribbon 10 is conveyed, as the gap 40 is not exposed. As a variation, splice members 31 and 32 may overhang edges 13 of the portions 12, 22 on one or each side. The splice members 31, 32 could then adhere to each other some distance from the edges 13.

In some situations, the splice members 31, 32 may have the same characteristics so they balance one another when a force is applied and do not buckle or twist. In this case, for example, both splice materials have the same Young's modulus and cross sectional area, for example, a Young's modulus of ≥1 GPa. However, the splice members 31, 32 need not have the same modulus and cross sectional area, but taken together would have an equivalent Young's modulus and cross sectional area so that when subject to a force of 20 kg (i.e., a 20 kgf=200 N), the splice member undergoes an elongation of ≤20%. The cross sectional area is that of the splice member as disposed adjacent to the gap 40. In another embodiment, the splice member has a Young's modulus and cross sectional area so that when subject to a force of 20 kg (i.e., a 20 kgf=200 N), the splice member undergoes an elongation of ≤10%. And in still another embodiment, the splice member has a Young's modulus and cross sectional area so that when subject to a force of 20 kg (i.e., a 20 kgf=200 N), the splice member undergoes an elongation of ≤5%.

A third embodiment will be explained in connection with FIGS. 1 and 8-9. In this embodiment, mainly the differences from the other embodiments will be described, with the understanding that the remaining elements are similar to those described in connection with the other embodiments, and wherein like reference numerals denote like elements throughout the embodiments. In this embodiment, a first splice member 31 is coupled to the first major surface 17 and to the second major surface 29. A second splice member 32 is coupled to the first major surface 27 and to the second major surface 19. The splice members 31, 32 are shown as being disposed side-by-side across the width 16, however, in some circumstances this need not be the case. Instead, the second splice member 32 may include an aperture through its middle portion and the first splice member 31 may be inserted therethrough (or vice versa), whereby the second splice member 32 is disposed adjacent both edges 13 and splice member 31 is disposed more centrally along longitudinal axis 14. Further, the splice members may be disposed across less than the entire width 16. Still further, although only two splice members are shown, any suitable number may be used. Similarly to the second embodiment, because at least a portion of the splice members 31, 32 are disposed in the gap 40 between the ends 15, 25, this embodiment provides a good ability to prevent the ends 15, from rubbing against one another.

A fourth embodiment will be explained in connection with FIGS. 1 and 10-12. In this embodiment, mainly the differences from the other embodiments will be described, with the understanding that the remaining elements are similar to those described in connection with the other embodiments, and wherein like reference numerals denote like elements throughout the embodiments. In this embodiment, splice member 31 has ends 33, is coupled to the first major surfaces 17, 27, and also to the second major surfaces 19, 29. In this embodiment, the splice member 31 is shown as being wrapped around one edge 13, with ends 33 located proximate the other edge 13 whereby the splice member 31 extends over the full width 16 on each the first major surfaces 17, 27, and the second major surfaces 19, 29. However, in some circumstances (as when the ribbon 10 is not expected to undergo wet processing) the splice member 31 may extend over less than the full width 16. Alternatively, the splice member 31 may be wrapped around both edges 13. In this latter case, the ends 33 may be disposed either adjacent to the first major surfaces 17, 27, or adjacent to the second major surfaces 19, 29, and either may abut one another or may be spaced from one another by a gap. In certain circumstances, as when the processes being performed on the glass ribbon 10 include application or spraying of fluids, it is desirable to have the ends 33 abut one another. Further, generally, it is advantageous to have the ends 33 be disposed away from the side on which processes performed on the glass ribbon 10 may dispense fluids. That is, if fluid from a process performed on the glass ribbon 10 is allowed to forcibly enter the gap 40, it may cause crack propagation through the ends 15, 25 and may even dislodge chunks of ribbon 10. Still further, if the gap 40 is of sufficient width 46, it may be possible to dispose the splice member 31 in part of the gap 40 (even to the point of contacting itself) in a manner similar to that discussed with respect to the splice members of the second embodiment. Alternatively, or in addition, the splice member 31 may have its ends 33 overhang edge 13 some distance and adhere upon itself.

A fifth embodiment will be explained in connection with FIGS. 1 and 13-14. In this embodiment, mainly the differences from the other embodiments will be described, with the understanding that the remaining elements are similar to those described in connection with the other embodiments, and wherein like reference numerals denote like elements throughout the embodiments. In this embodiment, glass ribbon 10 includes an edge tab 50 having a section 52, a web portion 54, and a thickness 58. The section 52 is coupled to at least a portion of the first major surface 17, 27, and/or the second major surface 19, 29, with adhesive. The edge tab 50 is disposed on the glass ribbon 10 so that web portion 54 extends from at least one edge 13 to facilitate handing and/or conveying of the ribbon 10 without damage. The web portion 54 is preferably flexible (but firm), and can be used to hold and/or convey and/or align the glass ribbon for processing in a manufacturing step without the need to directly contact interior non-coated portions of the ribbon 10. Web portion 54 thus provides a handling surface that can be contacted by handing equipment, such as rollers, without the need to physically contact the glass itself, and further may be used as an alignment aid should alignment with processing equipment be desired. For example, the web portion 54 of the edge tab 50 can be gripped by rollers, engaged with sprockets, clamped or any other method of securing the extended portion of the coating. A cross-sectional view of the glass ribbon 10 is shown in FIG. 14. The thickness 58 is that which extends above the first major surface 17, 27 of the glass ribbon portions 12, 22. Alternatively, the thickness 58 could be that which extends above the second major surface 19, 29 of the glass ribbon portions 12, 22, as when a splice member is disposed on those second major surfaces 19, 29. Although an edge tab 50 is shown on each of the edges 13, such need not be the case; instead there may be an edge tab 50 on only one of the edges. In this case, it may be desirable to have the splice member 31 extend around the edge 13 not having edge tab 50, as discussed in connection with the fourth embodiment and FIG. 12. Although shown as being thinner, the edge tab thickness in the web portion 54 may be approximately twice the thickness 58.

The splice member 31 has a thickness 38 that extends above the first major surface 17, 27. The thickness 38 is ≤the thickness 58 so that splice member 31 is not pressed by another layer of glass ribbon 10 when disposed in roll 2, thereby avoiding undue force on the glass ribbon 10. Although the splice member 31 is shown as being disposed on the first major surface 17, 27, instead, it may be disposed on the second major surface 19, 29, in which case the thicknesses 38, 58 would be measured from the second major surface 19, 29. Additionally, although only one splice member 31 is shown, a second splice member 32 may also be used in a manner similar to that described above in connection with the second and third embodiments. In such a case, the second splice member 32 would have a thickness similar to that just described in connection with splice member 31. Further, although the splice member 31 is shown as being separated from the edge tab 50 by a gap, in some circumstances such need not be the case; instead the ends 33 could abut the edge tab 50. However, it is desirable that the splice member 31 not overlap its thickness 38 with that 58 of the edge tab 50. If the thicknesses 38, 58 overlapped, a thick spot would develop in the roll 2, and an undue force may be exerted on the glass ribbon 10 within the roll 2. In some applications it may be acceptable if splice member 31 did overlap with the edge tabs 50 on one or both sides. Also, it should be noted that the edge tab 50 may exist on both glass elements 12 and 22 or just on one of these glass elements. If the edge tab 50 does exist on both glass elements 12 and 22, it may not be continuously the same element, but a gap may exist between the edge tab on element 12 and the edge tab on element 22. For example, the edge tab may or may not assist in performing any splicing function.

A sixth embodiment will be explained in connection with FIGS. 1 and 15. In this embodiment, mainly the differences from the other embodiments will be described, with the understanding that the remaining elements are similar to those described in connection with the other embodiments, and wherein like reference numerals denote like elements throughout the embodiments. In this embodiment, splice member 31 has a width 36 and a longitudinal axis 34, wherein the longitudinal axis 34 is disposed parallel to or coaxial with the longitudinal axis 14. The splice member 31 is shown as being coupled to the first major surfaces 17, 27, however, it may instead be coupled to the second major surfaces 19, 29. In this embodiment, the width 36 substantially equal to the width 16, however, in certain circumstances (as when the ribbon 10 is not expected to undergo wet processing) the width 36 may be somewhat smaller than width 16. Additionally, although not shown, a second section 32 (having a configuration similar to that just described in connection with splice member 31 of this embodiment) of the splice member may be coupled to the second major surfaces 19, 29. In this embodiment, the splice members 31 and 32 may be sections of one contiguous splice member wrapped around one or more of the edges 13 (as disclosed in connection with the fourth embodiment, or they may be separate members (as disclosed in connection with the second embodiment).

Some prophetic examples of splice joint parameters are set forth below to show how the cross sectional area and Young's modulus may vary yet still maintain an elongation within an acceptable range so that the portions 12, 22 are firmly and reliably held apart so that they remain aligned, and so that the ends 15, 25 do not rub or abrade one another.

Example 1

A splice member 31 having a thickness of 50 μm, a width of 250 mm, and a Young's modulus of 1 GPa, is applied to the major surfaces 17, 27, wherein gap 40 is 100 μm (corresponding to splice length). A 10 kgf (100 N) would produce a stress of 8 MPa, and a calculated strain of 0.8% (corresponding to a change in splice length of 0.8 μm).

Example 2

The splice member 31 and gap 40 are the same as in Example 1, except the splice member 31 has half the thickness (i.e., 25 μm).
Particularly: thickness of 25 μm; width of 250 mm; Young's modulus of 1 GPa; and gap of 100 μm.

In this example, a 10 kgf would produce a stress of 16 MPa, and a calculated strain of 1.6% (corresponding to a change in splice length of 1.6 μm).

Example 3

The splice member 31 and gap 40 are the same as in Example 1, except the splice member 31 has a lower modulus (i.e., 0.5 GPa).
Particularly: thickness of 50 μm; width of 250 mm; Young's modulus of 0.5 GPa; and gap of 100 μm.
In this example, a 10 kgf would produce a stress of 8 MPa, and a calculates strain of 1.6% (corresponding to a change in splice length of 1.6 nm).

Example 4

Two splice members 31, 32, disposed according to the second embodiment, each having characteristics according to Example 3 are used (i.e., a total splice member thickness of 100 μm). Gap 40 remains 100 μm.
Particularly, each splice member has a: thickness of 50 μm; width of 250 mm; and a Young's modulus of 0.5 GPa.
A 10 kgf would produce a stress of 4 MPa, and a calculated strain of 0.8% (corresponding to a change in splice length of 0.8 μm).

Example 5

The splice member 31 and gap 40 are the same as in Example 1, except the width of the splice member is narrower (i.e., 100 mm)
Particularly: thickness of 50 μm; width of 100 mm; Young's modulus of 1 GPa; and gap of 100 μm.
A 10 kgf would produce a stress of 20 MPa, and a calculated strain of 2% (corresponding to a change in splice length of 2 μm).

Example 6

A splice member 31 having a thickness of 25 μm, a width of 100 mm, and a Young's modulus of 0.5 GPa, is applied to the major surfaces 17, 27, wherein gap 40 is 5000 μm (corresponding to splice length). A 20 kgf (200 N) would produce a stress of 80 MPa, and a calculated strain of 16% (corresponding to a change in splice length of 800 μm).

A number of relationships can be see from the above examples. From a comparison of Example 1 with Example 2, it can be seen that a decrease in thickness of the splice member leads to an increase in both strain and change in splice length. From a comparison of Example 1 with Example 3, it can be seen that a decrease in Young's modulus leads to an increase in both strain and change in splice length. From a comparison of Example 4 with Example 3, it can be seen that using two splice members (having the same characteristics) instead of one leads to a decrease in both strain and change in splice length. From a comparison of Example 4 with Example 1, it can be seen that disposing two splice members each having the same thickness, but half the Young's modulus, as one splice member would produce a splice joint having a similar firmness, i.e., subject to the same strain and change in splice length when subject to the same force. From a comparison of Example 1 with Example 5, it can be seen that a decrease in width of the splice member leads to an increase in both strain and change in splice length. From a comparison of Example 1 with Example 6, it can be seen that a dramatic decrease in firmness of the splice (by way of decreased width, decreased thickness, and decreased modulus) leads to a dramatic increase in strain (and corresponding change in splice length), even more so than would be expected from the increase in from 10 kgf to 20 kgf, all other things being equal. That is, the change in elongation from a doubling of force, all other things being equal, would be expected to double. However, also then dramatically changing width, thickness, and modulus, of the splice member leads to a dramatic increase in the elongation.

One manner of forming ends 15, 25, from a continuous portion of ribbon 10 is shown in FIGS. 16 and 17. This may be useful to prepare the end of one roll 2 and the beginning of another roll 2 for splicing together. Alternatively, this manner of forming ends 15, 25 may be used when splicing any two ribbon portions 12, 22 together, whether or not either one is a part of a roll 2.

In this manner of forming ends 15, 25, first a tape 70 is coupled to the glass ribbon 10 so as to cross the intended cut line 73. The tape 70 may be of the same type described above in connection with the splice members 31, 32. The tape 70 should be compatible with subsequent processing conditions just like splice tape 31, however, it does not need to have the same Young's modulus if it is not used to actually hold the splice together. The tape 70 may be applied to either one or both of the major surfaces of the glass ribbon 10. Because the ends 15, 25 do not need to endure stresses related to the roll-to-roll manufacturing, as noted above, they do not need to be of as high a strength as the edges 13. Accordingly, a mechanical cutting method, for example, one using a blade, shear, or rotary cutter, may then be used to sever the glass ribbon 10 along the cut line 73, thereby forming ends 15, 25. Because a less-rigorous cutting method may be applied, a splice joint may be made more quickly. During severing, the mechanical cutting element may extend through the full thickness 18 of the glass ribbon 10. In this embodiment, the tape 70 contains any significant particulate from the cutting process. The tape 70 may then be removed from the glass ribbon 10 prior to splicing as discussed in connection with any of the other described embodiments. If tape 70 is removed, it's adhesion to the glass needs to be relatively low. In this case also it does not need to withstand subsequent processing conditions. An example of a temporary coating acceptable for cutting would be a silicone film or other low modulus material with relatively low temporary adhesion to glass. Alternatively, the tape 70 may be left in place, and the splice members 31 and/or 32 (as discussed in connection with any of the other described embodiments) placed over the top of it. When the tape 70 is left in place, it also assists in preventing crack propagation when the glass ribbon 10 is stressed during processing, as when it is bent over rollers. This manner of forming ends 15, 25 may be used in connection with any of the embodiments discussed herein. However, this manner of forming ends 15, 25 may be particularly useful when there is a need to cut through two dissimilar materials, for example glass and a polymer, as in the case with the splice of the fifth embodiment, wherein edge tabs 50 are present. In this case, the tape 70 would be placed on the ribbon between the edge tabs 50 on one or both major surfaces. Similarly to that noted above in the discussion of the fifth embodiment, it is beneficial to have the tape 70 not overlap the edge tabs 50, and to select the thickness of the tape 70 so that it together with the thickness 38 of the splice member are less than or equal to the thickness 58 of the edge tab 50. It may be acceptable in certain applications to have the tape 70 overlap the edge tabs 50 even though it causes an increase in thickness.

In addition to the above, before cutting along line 73, intentional breaks 75 and or 77 may be made cleanly across the width 16. The tape 70 is disposed on each side of each intentional break 75, 77 and, thus holds each of the newly formed portions 12, 22 of the glass ribbon 10 together after cutting is performed along line 73. The tape 70 can be applied either before or after the intentional breaks 75, 77 are formed. These clean breaks 75, 77 can be created by bend stress, and they may contain the potential propagation of cracks formed due to the mechanical cutting along line 73 which, as shown, is formed between the breaks 75, 77. More specifically, an initial defect may be made in the glass ribbon, the tape 70 would be applied over the initial defect, and then a bend stress applied to the glass ribbon to propagate the initial defect across the width of the glass ribbon. In this case, the tape 70 is left in place after the cutting, and the splice members 31, 32 would be applied over the top of it. When the glass ribbon 10 already includes a coating or laminate disposed thereon, i.e., the glass ribbon 10 is a coated glass ribbon, the step of first applying tape 70 may be omitted. Nonetheless, even in this case, the intentional breaks 75, 77 still provide a mechanism by which crack propagation may be limited. Alternatively to the configuration shown, tape 70 may be applied to both the first and second major surfaces of glass ribbon 10.

In any of the above-described embodiments of splice joint 30, the gap 40 may be filled, or partially filled with a filler material 80 (see FIGS. 20-23). In certain cases, as when wet processing will be performed on the ribbon 10, it is desirable to fully fill the gap 40. The filler material 80 may be a polymer (including a hardenable or curable type), or silicone, for example. The filler material 80 assists in reducing the amount of rubbing or abrading of the ends 15, 25 against each other. Additionally, the filler material reduces the amount of, or prevents, wet process materials from becoming trapped in the glass ribbon 10 and potentially contaminating downstream processes. Further, by reducing the amount of wet process materials that may impinge on the ends 15, 25, the filler material 80 reduces the chances of those process materials causing or propagating cracks in the portions 12, 22, or even causing pieces of the ribbon to come off.

One manner of disposing filler 80 in gap 40 will now be described in connection with FIGS. 18-23. As shown in FIGS. 18 and 19, first 12 and second 22 portions are disposed adjacent to one another and separated by gap 40. A first splice member 31 is coupled to the second major surfaces 19, 29 so as to expose the gap 40 from the top of the ribbon. As shown in FIGS. 20 and 21, filler material 80 is then disposed in the gap 40 and on top of the splice member 21. Finally, as shown in FIGS. 22 and 23, a second splice member 32 is then coupled to the first major surfaces 17, 27 over the filler material 80. In certain cases, as when wet processing will be performed on the glass ribbon 10, it is desirable for the splice members 31, 32 and/or filler material 80 to extend the full width of the glass ribbon 10. In other cases, it may be desirable for the splice members 31, 32, and/or the filler material 80 to extend over less than the full width of the glass ribbon 10.

Although two splice members 31, 32 are shown, it is possible to use only one of them on either of the first major surfaces 17, 27 or 19, 29 (as discussed in connection with the first embodiment shown in FIGS. 1-4). Further, it is possible to use one splice member 31 coupled to both the first major surfaces 17, 27 and the second major surfaces 19, 29, as discussed in connection with the fourth embodiment as shown in FIGS. 10-12. Still further, any suitable number of splice members may be used.

It should be emphasized that the above-described embodiments of the present invention, particularly any "preferred" embodiments, are merely possible examples of implementations, merely set forth for a clear understanding of various principles of the invention. Many variations and modifications may be made to the above-described embodiments of the invention without departing substantially from the spirit and various principles of the invention. All such modifications and variations are intended to be included herein within the scope of this disclosure and the present invention and protected by the following claims.

For example, although the roll 2 of glass ribbon 10 is shown without interleaving material, such could be present between layers of glass ribbon 10 in the roll 2. In such a case, the interleaving material may be removed from the surface of the glass ribbon 10, the splice joint formed, and the interleaving material replaced on the surface of the glass ribbon again.

Although the second member 22 is discussed as being a second portion of glass ribbon, the same splices discussed herein may be used when the second member 22 is a leader/trailer material other than glass, for example, paper, plastic, or metal. In general, the leader/trailer may be a non-brittle lower cost material than the flexible glass.

When the member 22 is a leader, the glass ribbon 10 may be spliced thereto as shown in FIG. 24 (in addition to the other arrangements disclosed herein). In FIG. 24, leader 60 is spliced to glass ribbon 10, and they travel in the direction of arrow 5. The leader 60 is made of a non-metallic material which will not abrade the glass ribbon 10. In this splice joint 30, the leader 60 and glass ribbon 10 overlap one another, and are electrostatically attracted to one another, in the area of width 62. That is, opposite electrostatic forces are applied to the glass ribbon 10 and the leader 60 so that when they come into proximity with one another, the electrostatic forces strongly attract one another. Because both the glass ribbon 10 and the leader 60 are non-conductive, the electrostatic force is sufficient to keep them in contact with one another, even when stored over a period on the order of months. It is desirable to have the leading member on top of the trailing member. Thus, as shown in FIG. 24, it is preferable to have the leader 60 on top of the glass ribbon 10 when the leader 60 is conveyed in the direction of arrow 5. Alternatively to that shown in FIG. 24, if member 60 were a trailer, and the glass ribbon was conveyed in a direction opposite to that of arrow 5, then the member 60 would preferable be attached to the bottom of the glass ribbon 10.

The splice member could be tape (including tape having its own adhesive layer thereon, or one in which a separate adhesive layer is applied either to the splice member, to the glass, or both), or a member coupled to the glass ribbon by electrostatic forces, as noted above in connection with the discussion of FIG. 24. Additionally, although splice members 31 and 32 are discussed as being two separate members, in some embodiments, they may be two different sections of one continuous splice member.

Although in FIG. 1, the glass ribbon 10 is shown as being conveyed in the direction 5, i.e., wherein the second portion 22 is shown as the leading end, throughout any of the embodiments, either the first portion 12 or the second portion 22 may be the leading end. Further, the glass ribbon 10 may be conveyed (in the direction of arrow 5) to another roll wherein it is wound up again, or to any other suitable downstream process. In this context, as noted above, the term "downstream process" can include various processes.

The glass ribbon portions 12 and 22 or alternatively the glass ribbon and leader/trailer material may be of different widths. If the leader/trailer is of different width than the glass ribbon, the leader/trailer may have its width tapered so that it more closely matches that of the glass ribbon at the splice joint.

The glass ribbon may have a single or multiple coatings applied to either one or both of its major surfaces. These multiple coatings can include either partially fabricated or fully fabricated device structures.

Although the glass ribbon 10 is disclosed as being disposed in a roll 2, such need not be the case. That is, the glass ribbon 10 may be fully extended, or may be in the form of sheets or pieces of any length spliced together. Further, although the glass ribbon is described as having first and second portions, any suitable number of portions may be spliced together, one to the other, according to the structures and methods disclosed herein, whereby any suitable length of glass ribbon may be formed into the roll 2. Moreover, although in FIG. 1 the glass ribbon 10 is shown as being unrolled from a roll 2, the splicing methods and joints disclosed herein may be applied to a glass ribbon conveyed directly from a forming process, for example, a down-draw process, a fusion process, a slot draw process, an up-draw process, or a float process.

What is claimed is:

1. A method of preparing a coated glass ribbon for splicing, comprising:
    obtaining the coated glass ribbon, the coated glass ribbon comprising a glass ribbon and a coating disposed on the glass ribbon;
    determining a line on the coated glass ribbon along which the coated glass ribbon is to be cut;
    creating a fracture line extending through an entire thickness of the glass ribbon without completely severing the coating disposed on the glass ribbon, the created fracture line being positioned between the determined line and a portion of the coated glass ribbon to be used after being cut; and
    cutting the coated glass ribbon along the determined line after the creating of the fracture line.

2. The method according to claim 1, further comprising joining cut ends of the coated glass ribbon to a leader or trailer.

* * * * *